United States Patent
Van der Puy et al.

(10) Patent No.: US 11,746,180 B2
(45) Date of Patent: *Sep. 5, 2023

(54) CATALYSTS FOR POLYURETHANE FOAM POLYOL PREMIXES CONTAINING HALOGENATED OLEFIN BLOWING AGENTS

(71) Applicant: HONEYWELL INTERNATIONAL INC., Charlotte, NC (US)

(72) Inventors: Michael Van der Puy, Amherst, NY (US); David J. Williams, East Amherst, NY (US); Clifford P. Gittere, Amherst, NY (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/275,568

(22) Filed: Feb. 14, 2019

(65) Prior Publication Data
US 2020/0048397 A1 Feb. 13, 2020
US 2022/0298288 A9 Sep. 22, 2022

Related U.S. Application Data

(63) Continuation of application No. 15/843,684, filed on Dec. 15, 2017, now abandoned, which is a continuation of application No. 12/967,345, filed on Dec. 14, 2010, now abandoned.

(60) Provisional application No. 61/287,603, filed on Dec. 17, 2009.

(51) Int. Cl.
*C08G 18/18* (2006.01)
*C08J 9/14* (2006.01)
*C08K 5/02* (2006.01)
*C08K 5/053* (2006.01)

(52) U.S. Cl.
CPC .......... *C08G 18/1875* (2013.01); *C08J 9/146* (2013.01); *C08J 9/149* (2013.01); *C08G 2110/0025* (2021.01); *C08G 2115/02* (2021.01); *C08J 2203/162* (2013.01); *C08J 2375/04* (2013.01); *C08K 5/02* (2013.01); *C08K 5/053* (2013.01)

(58) Field of Classification Search
CPC .. B01J 31/128; C08G 18/163; C08G 18/1816; C08G 18/1875; C08G 18/22; C08G 18/222; C08G 18/225; C08G 18/227; C08G 2101/0016; C08G 2101/0025; C08G 2105/02; C08J 9/144; C08J 9/146; C08J 9/149; C08J 2203/162; C08J 2375/04; C08K 5/02; C08K 5/053
See application file for complete search history.

(56) References Cited

U.S. PATENT DOCUMENTS

| | | | |
|---|---|---|---|
| 9,051,442 B2 * | 6/2015 | Williams | |
| 9,550,854 B2 * | 1/2017 | Van Der Puy | |
| 9,556,303 B2 * | 1/2017 | Ross | |
| 2002/0013379 A1 * | 1/2002 | Singh | |
| 2006/0022166 A1 * | 2/2006 | Wilson | |
| 2012/0172476 A1 * | 7/2012 | Costa | C08G 18/4018 521/170 |
| 2016/0145374 A1 * | 5/2016 | Ishikawa | C08G 18/341 521/129 |

* cited by examiner

*Primary Examiner* — John M Cooney
(74) *Attorney, Agent, or Firm* — Colleen D. Szuch

(57) ABSTRACT

The invention provides polyurethane and polyisocyanurate foams and methods for the preparation thereof. More particularly, the invention relates to closed-celled, polyurethane and polyisocyanurate foams and methods for their preparation. The foams are characterized by a fine uniform cell structure and little or no foam collapse. The foams are produced with a polyol premix composition which comprises a combination of a hydrohaloolefin blowing agent, a polyol, a silicone surfactant, and a non-amine catalyst used alone or in combination with an amine catalyst.

20 Claims, No Drawings

CATALYSTS FOR POLYURETHANE FOAM POLYOL PREMIXES CONTAINING HALOGENATED OLEFIN BLOWING AGENTS

CROSS REFERENCE TO RELATED APPLICATIONS

This application is a continuation of U.S. application Ser. No. 15/843,684, filed Dec. 15, 2017 (now pending), which application is related to and claims the priority benefit as a continuation of U.S. application Ser. No. 12/967,345, filed Dec. 14, 2010 (now abandoned), which in turn claims the priority benefit of U.S. provisional application No. 61/287,603 filed Dec. 17, 2009, the contents of which are incorporated herein by reference. This application is also a continuation in part of Ser. No. 14/710,104, filed May 12, 2015, currently pending, which in turn is a division of Ser. No. 11/861,803, filed Sep. 26, 2007 (now U.S. Pat. No. 9,029,430, issued May 12, 2015), which is a division of Ser. No. 11/474,887, filed Jun. 26, 2006 (now U.S. Pat. No. 9,796,848, issued Oct. 24, 2017), which claims the priority benefit of U.S. provisional application Nos. 60/784,731, filed Mar. 21, 2006 and 60/693,853, filed Jun. 24, 2005 (both now expired).

FIELD OF THE INVENTION

The present invention pertains to polyurethane and polyisocyanurate foams and methods for the preparation thereof.

BACKGROUND OF THE INVENTION

Low density, rigid to semi-rigid polyurethane or polyisocyanurate foams have utility in a wide variety of insulation applications including roofing systems, building panels, building envelope insulation, spray applied foams, one and two component froth foams, insulation for refrigerators and freezers, and so called integral skin for application such as steering wheels and other automotive or aerospace cabin parts, shoe soles, and amusement park restraints. Critical to the large-scale commercial acceptance of rigid polyurethane foams is their ability to provide a good balance of properties. For example, rigid polyurethane and polyisocyanurate foams are known to provide outstanding thermal insulation, excellent fire resistance properties, and superior structural properties at reasonably low densities. Integral skin foams are known to produce a tough durable outer skin and a cellular, cushioning core.

It is known in the art to produce rigid or semi-rigid polyurethane and polyisocyanurate foams by reacting a polyisocyanate with one or more polyols in the presence of one or more blowing agents, one or more catalysts, one or more surfactants and optionally other ingredients. Blowing agents include hydrocarbons, fluorocarbons, chlorocarbons, chlorofluorocarbons, hydrochlorofluorocarbons, halogenated hydrocarbons, ethers, esters, aldehydes, alcohols, ketones, organic acid or gas, most often $CO_2$, generating materials. Heat is generated when the polyisocyanate reacts with the polyol, and volatilizes the blowing agent contained in the liquid mixture, thereby forming bubbles therein. In the case of gas generating materials, gaseous species are generated by thermal decomposition or reaction with one or more of the ingredients used to produce the polyurethane or polyisocyanurate foam. As the polymerization reaction proceeds, the liquid mixture becomes a cellular solid, entrapping the blowing agent in the foam's cells. If a surfactant is not used in the foaming composition, the bubbles simply pass through the liquid mixture without forming a foam or forming a foam with large, irregular cells rendering it not useful.

The foam industry has historically used liquid fluorocarbon blowing agents because of their ease of use and ability to produce foams with superior mechanical and thermal insulation properties. Fluorocarbons not only act as blowing agents by virtue of their volatility, but also are encapsulated or entrained in the closed cell structure of the rigid foam and are the major contributor to the low thermal conductivity properties of the rigid urethane foams. Fluorocarbon-based blowing agents also produce a foam having a favorable k-factor. The k-factor is the rate of transfer of heat energy by conduction through one square foot of one-inch thick homogenous material in one hour where there is a difference of one degree Fahrenheit perpendicularly across the two surfaces of the material. Since the utility of closed-cell polyurethane-type foams is based, in part, on their thermal insulation properties, it would be advantageous to identify materials that produce lower k-factor foams.

Preferred blowing agents also have low global warming potential. Among these are hydrohaloolefins including hydrofluoroolefins of which trans-1,3,3,3-tetrafluoropropene (1234ze(E)) and 1,1,1,4,4,4hexafluorobut-2-ene (1336mzzm(Z)) are of particular interest and hydrochlorofluoroolefins of which trans-1-chloro-3,3,3-trifluoropropene (1233zd(E)) is of particular interest. Processes for the manufacture of trans-1,3,3,3-tetrafluoropropene are disclosed in U.S. Pat. Nos. 7,230,146 and 7,189,884. Processes for the manufacture of trans-1-chloro-3,3,3-trifluoropropene are disclosed in U.S. Pat. Nos. 6,844,475 and 6,403,847.

It is convenient in many applications to provide the components for polyurethane or polyisocyanurate foams in pre-blended formulations. Most typically, the foam formulation is pre-blended into two components. The polyisocyanate and optionally isocyanate compatible raw materials, including but not limited to certain blowing agents and non-reactive surfactants, comprise the first component, commonly referred to as the "A" component. A polyol or mixture of polyols, one or more surfactant, one or more catalyst, one or more blowing agent, and other optional components including but not limited to flame retardants, colorants, compatibilizers, and solubilizers comprise the second component, commonly referred to as the "B" component. Accordingly, polyurethane or polyisocyanurate foams are readily prepared by bringing together the A and B side components either by hand mix for small preparations and, preferably, machine mix techniques to form blocks, slabs, laminates, pour-in-place panels and other items, spray applied foams, froths, and the like. Optionally, other ingredients such as fire retardants, colorants, auxiliary blowing agents, and other polyols can be added to the mixing head or reaction site. Most conveniently, however, they are all incorporated into one B component.

A shortcoming of two-component systems, especially those using certain hydrohaloolefins, including 1234ze(E), 1336(Z), and 1233zd(E), is the shelf-life of the B-side composition. Normally when a foam is produced by bringing together the A and B side components, a good foam is obtained. However, if the polyol premix composition is aged, prior to treatment with the polyisocyanate, the foams are of lower quality and may even collapse during the formation of the foam.

SUMMARY OF THE INVENTION

It has now been found that the origin of the problem is the reaction of certain amine catalysts with certain hydrohaloolefins including 1234ze, 1233zd, 1336mzzm, and/or combinations thereof. It has been found that, subsequent to the decomposition of the blowing agent, the molecular weight of the polymeric silicone surfactants, if present, is detrimentally altered.

While it is possible to solve the problem by separating the blowing agent, surfactant, and catalyst, for example by adding the blowing agent, amine catalyst, or surfactant to the polyisocyanate, ("A" component) or by introducing the blowing agent, amine catalyst, or surfactant using a separate stream from the "A" or "B" component, a preferred solution is one that does not require a change in the way the foams are made. It has now been found that non-amine catalysts, e.g. inorgano-metallic catalysts, organo-metallic catalysts and/or quaternary ammonium carboxylate catalysts, either alone or in combination with amine catalysts, can extend the shelf life of polyol premixes containing hydrohaloolefins, such as, but not limited to 1234ze(E), 1233zd(E), and/or 1336mzzm(Z), such that good quality foams can be produced even if the polyol blend has been aged several weeks or months.

Accordingly, this invention relates to rigid to semi-rigid, polyurethane and polyisocyanurate foams and methods for their preparation, which foams are characterized by a fine uniform cell structure and little or no foam collapse. The foams are produced with an organic polyisocyanate and a polyol premix composition which comprises a combination of a blowing agent, which is preferably a hydrohaloolefin, a polyol, a silicone surfactant, and a catalyst in which catalyst comprises one or more non-amine catalyst, preferably an inorgano- or organo-metallic compound or a quaternary ammonium carboxylate catalyst, and also may include one or more amine catalysts.

DETAILED DESCRIPTION OF THE INVENTION

The invention provides polyol premix composition which comprises a combination of a blowing agent, one or more polyols, one or more silicone surfactants, and a catalyst in which catalyst is a non-amine catalyst, such as an inorgano- or organo-metallic compound or quaternary ammonium carboxylate material used either alone or in combination with amine catalysts, wherein the blowing agent comprises one or more hydrohaloolefins, and optionally a hydrocarbon, fluorocarbon, chlorocarbon, hydrochlorofluorocarbon, hydrofluorocarbon, halogenated hydrocarbon, ether, ester, alcohol, aldehyde, ketone, organic acid, gas generating material, water or combinations thereof.

The invention also provides a method of preparing a polyurethane or polyisocyanurate foam comprising reacting an organic polyisocyanate with the polyol premix composition.

The blowing agent component comprises a hydrohaloolefin, preferably comprising at least one or a combination of 1234ze(E), 1233zd(E), and/or 1336mzzm(Z), and optionally a hydrocarbon, fluorocarbon, chlorocarbon, fluorochlorocarbon, halogenated hydrocarbon, ether, fluorinated ether, ester, alcohol, aldehyde, ketone, organic acid, gas generating material, water or combinations thereof.

The hydrohaloolefin preferably comprises at least one haloalkene such as a fluoroalkene or chlorofluoroalkene containing from 3 to 4 carbon atoms and at least one carbon-carbon double bond. Preferred hydrohaloolefins non-exclusively include trifluoropropenes, tetrafluoropropenes such as (1234), pentafluoropropenes such as (1225), chlorotrifloropropenes such as (1233), chlorodifluoropropenes, chlorotrifluoropropenes, chlorotetrafluoropropenes, hexafluorobutenes (1336) and combinations of these. More preferred that the compounds of the present invention are the tetrafluoropropene, pentafluoropropene, and chlorotrifloropropene compounds in which the unsaturated terminal carbon has not more than one F or Cl substituent. Included are 1,3,3,3-tetrafluoropropene (1234ze); 1,1,3,3-tetrafluoropropene; 1,2,3,3,3-pentafluoropropene (1225ye), 1,1,1-trifluoropropene; 1,2,3,3,3-pentafluoropropene, 1,1,1,3,3-pentafluoropropene (1225zc) and 1,1,2,3,3-pentafluoropropene (1225yc); (Z)-1,1,1,2,3-pentafluoropropene (1225yez); 1-chloro-3,3,3-trifluoropropene (1233zd), 1,1,1,4,4,4-hexafluorobut-2-ene (1336mzzm) or combinations thereof, and any and all stereoisomers of each of these.

Preferred hydrohaloolefins have a Global Warming Potential (GWP) of not greater than 150, more preferably not greater than 100 and even more preferably not greater than 75. As used herein, "GWP" is measured relative to that of carbon dioxide and over a 100-year time horizon, as defined in "The Scientific Assessment of Ozone Depletion, 2002, a report of the World Meteorological Association's Global Ozone Research and Monitoring Project," which is incorporated herein by reference. Preferred hydrohaloolefins also preferably have an Ozone Depletion Potential (ODP) of not greater than 0.05, more preferably not greater than 0.02 and even more preferably about zero. As used herein, "ODP" is as defined in "The Scientific Assessment of Ozone Depletion, 2002, A report of the World Meteorological Association's Global Ozone Research and Monitoring Project," which is incorporated herein by reference.

Preferred optional co-blowing agents non-exclusively include water, organic acids that produce $CO_2$ and/or CO, hydrocarbons; ethers, halogenated ethers; esters, alcohols, aldehydes, ketones, pentafluorobutane; pentafluoropropane; hexafluoropropane; heptafluoropropane; trans-1,2 dichloroethylene; methylal, methyl formate; 1-chloro-1,2,2,2-tetrafluoroethane (124); 1,1-dichloro-1-fluoroethane (141b); 1,1,1,2-tetrafluoroethane (134a); 1,1,2,2-tetrafluoroethane (134); 1-chloro 1,1-difluoroethane (142b); 1,1,1,3,3-pentafluorobutane (365mfc); 1,1,1,2,3,3,3-heptafluoropropane (227ea); trichlorofluoromethane (11); dichlorodifluoromethane (12); dichlorofluoromethane (22); 1,1,1,3,3,3-hexafluoropropane (236fa); 1,1,1,2,3,3-hexafluoropropane (236ea); 1,1,1,2,3,3,3-heptafluoropropane (227ea), difluoromethane (32); 1,1-difluoroethane (152a); 1,1,1,3,3-pentafluoropropane (245fa); butane; isobutane; normal pentane; isopentane; cyclopentane, or combinations thereof. In certain embodiments the co-blowing agent(s) include one or a combination of water and/or normal pentane, isopentane or cyclopentane, which may be provided with one or a combination of the hydrohaloolefin blowing agents discussed herein. The blowing agent component is usually present in the polyol premix composition in an amount of from about 1 wt. % to about 30 wt. %, preferably from about 3 wt. % to about 25 wt. %, and more preferably from about 5 wt. % to about 25 wt. %, by weight of the polyol premix composition. When both a hydrohaloolefin and an optional blowing agent are present, the hydrohaloolefin component is usually present in the blowing agent component in an amount of from about 5 wt. % to about 90 wt. %, preferably from about 7 wt. % to about 80 wt. %, and more preferably from about 10 wt. % to about 70 wt. %, by weight of the blowing agent component; and the optional blowing agent is usually present in the blowing agent component in an amount of from about 95 wt. % to about 10 wt. %, preferably from about 93 wt. % to about 20 wt. %, and more preferably from about 90 wt. % to about 30 wt. %, by weight of the blowing agent component.

The polyol component, which includes mixtures of polyols, can be any polyol which reacts in a known fashion with an isocyanate in preparing a polyurethane or polyisocyanurate foam. Useful polyols comprise one or more of a sucrose containing polyol; phenol, a phenol formaldehyde containing polyol; a glucose containing polyol; a sorbitol containing polyol; a methylglucoside containing polyol; an aromatic polyester polyol; glycerol; ethylene glycol; diethylene glycol; propylene glycol; graft copolymers of polyether polyols with a vinyl polymer; a copolymer of a polyether polyol with a polyurea; one or more of (a) condensed with one or more of (b), wherein (a) is selected from glycerine, ethylene glycol, diethylene glycol, trimethylolpropane, ethylene diamine, pentaerythritol, soy oil, lecithin, tall oil, palm oil, and castor oil; and (b) is selected from ethylene oxide, propylene oxide, a mixture of ethylene oxide and propylene oxide; and combinations thereof. The polyol component is usually present in the polyol premix composition in an amount of from about 60 wt. % to about 95 wt. %, preferably from about 65 wt. % to about 95 wt. %, and more preferably from about 70 wt. % to about 90 wt. %, by weight of the polyol premix composition.

The polyol premix composition next contains a silicone surfactant. The silicone surfactant is used to form a foam from the mixture, as well as to control the size of the bubbles of the foam so that a foam of a desired cell structure is obtained. Preferably, a foam with small bubbles or cells therein of uniform size is desired since it has the most desirable physical properties such as compressive strength and thermal conductivity. Also, it is critical to have a foam with stable cells which do not collapse prior to forming or during foam rise.

Silicone surfactants for use in the preparation of polyurethane or polyisocyanurate foams are available under a number of trade names known to those skilled in this art. Such materials have been found to be applicable over a wide range of formulations allowing uniform cell formation and maximum gas entrapment to achieve very low density foam structures. The preferred silicone surfactant comprises a polysiloxane polyoxyalkylene block co-polymer. Some representative silicone surfactants useful for this invention are Momentive's L-5130, L-5180, L-5340, L-5440, L-6100, L-6900, L-6980 and L-6988; Air Products DC-193, DC-197, DC-5582, and DC-5598; and B-8404, B-8407, B-8409 and B-8462 from Evonik Industries AG of Essen, Germany Others are disclosed in U.S. Pat. Nos. 2,834,748; 2,917,480; 2,846,458 and 4,147,847. The silicone surfactant component is usually present in the polyol premix composition in an amount of from about 0.5 wt. % to about 5.0 wt. %, preferably from about 1.0 wt. % to about 4.0 wt. %, and more preferably from about 1.5 wt. % to about 3.0 wt. %, by weight of the polyol premix composition.

The polyol premix composition may optionally contain a non-silicone surfactant, such as a non-silicone, non-ionic surfactant. Such may include oxyethylated alkylphenols, oxyethylated fatty alcohols, paraffin oils, castor oil esters, ricinoleic acid esters, turkey red oil, groundnut oil, paraffins, and fatty alcohols. A preferred non-silicone non-ionic surfactant is LK-443 which is commercially available from Air Products Corporation. When a non-silicone, non-ionic surfactant used, it is usually present in the polyol premix composition in an amount of from about 0.25 wt. % to about 3.0 wt. %, preferably from about 0.5 wt. % to about 2.5 wt. %, and more preferably from about 0.75 wt. % to about 2.0 wt. %, by weight of the polyol premix composition.

The inventive polyol premix composition next contains a catalyst or catalysts at least one of which is a non-amine catalyst. In one embodiment, the non-amine catalysts are inorgano- or organo-metallic compounds. Useful inorgano- or organo-metallic compounds include, but are not limited to, organic salts, Lewis acid halides, or the like, of any metal, including, but not limited to, transition metals, post-transition (poor) metals, rare earth metals (e.g. lanthanides), metalloids, alkali metals, alkaline earth metals, or the like. Examples of such metals may include, but are not limited to, bismuth, lead, tin, zinc, chromium, cobalt, copper, iron, manganese, magnesium, potassium, sodium, titanium, mercury, zinc, antimony, uranium, cadmium, thorium, aluminum, nickel, cerium, molybdenum, vanadium, zirconium, or combinations thereof. Non-exclusive examples of such inorgano- or organo-metallic catalysts include, but are not limited to, bismuth nitrate, lead 2-ethylhexoate, lead benzoate, lead naphthanate, ferric chloride, antimony trichloride, antimony glycolate, tin salts of carboxylic acids, dialkyl tin salts of carboxylic acids, potassium acetate, potassium octoate, potassium 2-ethylhexoate, potassium salts of carboxylic acids, zinc salts of carboxylic acids, zinc 2-ethylhexanoate, glycine salts, alkali metal carboxylic acid salts, sodium N-(2-hydroxy-5-nonylphenol)methyl-N-methylglycinate, tin (II) 2-ethylhexanoate, dibutyltin dilaurate, or combinations thereof. These catalysts are usually present in the polyol premix composition in an amount of from about 0.25 wt. % to about 3.0 wt. %, preferably from about 0.3 wt. % to about 2.5 wt. %, and more preferably from about 0.35 wt. % to about 2.0 wt. %, by weight of the polyol premix composition. While these are usual amounts, the quantity amount of the foregoing catalyst can vary widely, and the appropriate amount can be easily be determined by those skilled in the art.

In another embodiment of the invention, the non-amine catalyst is a quaternary ammonium carboxylate. Useful quaternary ammonium carboxylates include, but are not limited to: (2-hydroxypropyl)trimethylammonium 2-ethylhexanoate (TMR® sold by Air Products and Chemicals) and (2-hydroxypropyl)trimethylammonium formate (TMR-2® sold by Air Products and Chemicals). These quaternary ammonium carboxylate catalysts are usually present in the polyol premix composition in an amount of from about 0.25 wt. % to about 3.0 wt. %, preferably from about 0.3 wt. % to about 2.5 wt. %, and more preferably from about 0.35 wt. % to about 2.0 wt. %, by weight of the polyol premix composition. While these are usual amounts, the quantity amount of catalyst can vary widely, and the appropriate amount can be easily be determined by those skilled in the art.

In another embodiment, the non-amine catalyst is used in combination with an amine catalyst. Such amine catalysts may include any compound containing an amino group and exhibiting the catalytic activity provided herein. Such compounds may be straight chain or cyclic non-aromatic or aromatic in nature. Useful, non-limiting, amines include primary amines, secondary amines or tertiary amines Useful tertiary amine catalysts non-exclusively include N,N,N',N",N"-pentamethyldiethyltriamine, N,N-dicyclohexylmethylamine; N,N-ethyldiisopropylamine; N,N-dimethylcyclohexylamine; N,N-dimethylisopropylamine; N-methyl-N-isopropylbenzylamine; N-methyl-N-cyclopentylbenzylamine; N-isopropyl-N-sec-butyltrifluoroethylamine; N,N-diethyl-(α-phenylethyl)amine, N,N,N-tri-n-propylamine, or combinations thereof. Useful secondary amine catalysts non-exclusively include dicyclohexylamine; t-butylisopropylamine; di-t-butylamine; cyclohexyl-t-butylamine; di-sec-butylamine, dicyclopentylamine; di-(α-trifluoromethylethyl)amine; di-(α-phenylethyl)amine; or combinations thereof. Useful primary amine catalysts non-exclusively include: triphenylmethylamine and 1,1-diethyl-n-propylamine.

Other useful amines includes morpholines, imidazoles, ether containing compounds, and the like. These include:
dimorpholinodiethylether
N-ethylmorpholine
N-methylmorpholine
bis(dimethylaminoethyl) ether
imidizole
n-methylimidazole
1,2-dimethylimidazole
dimorpholinodimethylether
N,N,N',N',N",N"-pentamethyldiethylenetriamine
N,N,N',N',N",N"-pentaethyldiethylenetriamine
N,N,N',N',N",N"-pentamethyldipropylenetriamine
bis(diethylaminoethyl) ether
bis(dimethylaminopropyl) ether.

In embodiments where an amine catalyst is provided, the catalyst may be provided in any amount to achieve the function of the instant invention without affecting the foam forming or storage stability of the composition, as characterized herein. To this end, the amine catalyst may be provided in amounts less than or greater than the non-amine catalyst.

The preparation of polyurethane or polyisocyanurate foams using the compositions described herein may follow any of the methods well known in the art can be employed, see Saunders and Frisch, Volumes I and II Polyurethanes Chemistry and technology, 1962, John Wiley and Sons, New York, N.Y. or Gum, Reese, Ulrich, Reaction Polymers, 1992, Oxford University Press, New York, N.Y. or Klempner and Sendijarevic, Polymeric Foams and Foam Technology, 2004, Hanser Gardner Publications, Cincinnati, Ohio. In general, polyurethane or polyisocyanurate foams are prepared by combining an isocyanate, the polyol premix composition, and other materials such as optional flame retardants, colorants, or other additives. These foams can be rigid, flexible, or semi-rigid, and can have a closed cell structure, an open cell structure or a mixture of open and closed cells.

It is convenient in many applications to provide the components for polyurethane or polyisocyanurate foams in pre-blended formulations. Most typically, the foam formulation is pre-blended into two components. The isocyanate and optionally other isocyanate compatible raw materials, including but not limited to blowing agents and certain silicone surfactants, comprise the first component, commonly referred to as the "A" component. The polyol mixture composition, including surfactant, catalysts, blowing agents, and optional other ingredients comprise the second component, commonly referred to as the "B" component. In any given application, the "B" component may not contain all the above listed components, for example some formulations omit the flame retardant if flame retardancy is not a required foam property. Accordingly, polyurethane or polyisocyanurate foams are readily prepared by bringing together the A and B side components either by hand mix for small preparations and, preferably, machine mix techniques to form blocks, slabs, laminates, pour-in-place panels and other items, spray applied foams, froths, and the like. Optionally, other ingredients such as fire retardants, colorants, auxiliary blowing agents, water, and even other polyols can be added as a stream to the mix head or reaction site. Most conveniently, however, they are all incorporated into one B component as described above.

A foamable composition suitable for forming a polyurethane or polyisocyanurate foam may be formed by reacting an organic polyisocyanate and the polyol premix composition described above. Any organic polyisocyanate can be employed in polyurethane or polyisocyanurate foam synthesis inclusive of aliphatic and aromatic polyisocyanates. Suitable organic polyisocyanates include aliphatic, cycloaliphatic, araliphatic, aromatic, and heterocyclic isocyanates which are well known in the field of polyurethane chemistry. These are described in, for example, U.S. Pat. Nos. 4,868,224; 3,401,190; 3,454,606; 3,277,138; 3,492,330; 3,001,973; 3,394,164; 3,124,605; and 3,201,372. Preferred as a class are the aromatic polyisocyanates.

Representative organic polyisocyanates correspond to the formula:

$$R(NCO)_z$$

wherein R is a polyvalent organic radical which is either aliphatic, aralkyl, aromatic or mixtures thereof, and z is an integer which corresponds to the valence of R and is at least two. Representative of the organic polyisocyanates contemplated herein includes, for example, the aromatic diisocyanates such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4',4"-triphenylmethane triisocyanate, 2,4,6-toluene triisocyanates; the aromatic tetraisocyanates such as 4,4'-dimethyldiphenylmethane-2,2'5,5'-tetraisocyanate, and the like; arylalkyl polyisocyanates such as xylylene diisocyanate; aliphatic polyisocyanate such as hexamethylene-1,6-diisocyanate, lysine diisocyanate methylester and the like; and mixtures thereof. Other organic polyisocyanates include polymethylene polyphenylisocyanate, hydrogenated methylene diphenylisocyanate, m-phenylene diisocyanate, naphthylene-1,5-diisocyanate, 1-methoxyphenylene-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate; Typical aliphatic polyisocyanates are alkylene diisocyanates such as trimethylene diisocyanate, tetramethylene diisocyanate, and hexamethylene diisocyanate, isophorene diisocyanate, 4,4'-methylenebis(cyclohexyl isocyanate), and the like; typical aromatic polyisocyanates include m-, and p-phenylene disocyanate, polymethylene polyphenyl isocyanate, 2,4- and 2,6-toluenediisocyanate, dianisidine diisocyanate, bitoylene isocyanate, naphthylene 1,4-diisocyanate, bis(4-isocyanatophenyl) methene, bis(2-methyl-4-isocyanatophenyl)methane, and the like. Preferred polyisocyanates are the polymethylene polyphenyl isocyanates, Particularly the mixtures containing from about 30 to about 85 percent by weight of methylenebis (phenyl isocyanate) with the remainder of the mixture comprising the polymethylene polyphenyl polyisocyanates of functionality higher than 2. These polyisocyanates are prepared by conventional methods known in the art. In the present invention, the polyisocyanate and the polyol are employed in amounts which will yield an NCO/OH stoichiometric ratio in a range of from about 0.9 to about 5.0. In the present invention, the NCO/OH equivalent ratio is, preferably, about 1.0 or more and about 3.0 or less, with the ideal range being from about 1.1 to about 2.5. Especially suitable organic polyisocyanate include polymethylene polyphenyl isocyanate, methylenebis(phenyl isocyanate), toluene diisocyanates, or combinations thereof.

In the preparation of polyisocyanurate foams, trimerization catalysts are used for the purpose of converting the blends in conjunction with excess A component to polyisocyanurate-polyurethane foams. The trimerization catalysts employed can be any catalyst known to one skilled in the art, including, but not limited to, glycine salts, tertiary amine trimerization catalysts, quaternary ammonium carboxylates, and alkali metal carboxylic acid salts and mixtures of the various types of catalysts. Preferred species within the classes are potassium acetate, potassium octoate, and sodium N-(2-hydroxy-5-nonylphenol)methyl-N-methylglycinate.

Conventional flame retardants can also be incorporated, preferably in amount of not more than about 20 percent by weight of the reactants. Optional flame retardants include tris(2-chloroethyl)phosphate, tris(2-chloropropyl)phosphate, tris(2,3-dibromopropyl)phosphate, tris(1,3-dichloropropyl)phosphate, tri(2-chloroisopropyl)phosphate, tricresyl phosphate, tri(2,2-dichloroisopropyl)phosphate, diethyl N,N-bis(2-hydroxyethyl) aminomethylphosphonate, dimethyl methylphosphonate, tri(2,3-dibromopropyl)phosphate, tri(1,3-dichloropropyl)phosphate, and tetra-kis-(2-chloroethyl)ethylene diphosphate, triethylphosphate, diammonium phosphate, various halogenated aromatic compounds, antimony oxide, aluminum trihydrate, polyvinyl chloride, melamine, and the like. Other optional ingredients can include from 0 to about 7 percent water, which chemically reacts with the isocyanate to produce carbon dioxide. This carbon dioxide acts as an auxiliary blowing agent. Formic acid is also used to produce carbon dioxide by reacting with the isocyanate and is optionally added to the "B"component.

In addition to the previously described ingredients, other ingredients such as, dyes, fillers, pigments and the like can be included in the preparation of the foams. Dispersing agents and cell stabilizers can be incorporated into the present blends. Conventional fillers for use herein include, for example, aluminum silicate, calcium silicate, magnesium silicate, calcium carbonate, barium sulfate, calcium sulfate, glass fibers, carbon black and silica. The filler, if used, is normally present in an amount by weight ranging from about 5 parts to 100 parts per 100 parts of polyol. A pigment which can be used herein can be any conventional pigment such as titanium dioxide, zinc oxide, iron oxide, antimony oxide, chrome green, chrome yellow, iron blue siennas, molybdate oranges and organic pigments such as para reds, benzidine yellow, toluidine red, toners and phthalocyanines.

The polyurethane or polyisocyanurate foams produced can vary in density from about 0.5 pounds per cubic foot to about 60 pounds per cubic foot, preferably from about 1.0 to 20.0 pounds per cubic foot, and most preferably from about 1.5 to 6.0 pounds per cubic foot. The density obtained is a function of how much of the blowing agent or blowing agent mixture disclosed in this invention plus the amount of auxiliary blowing agent, such as water or other co-blowing agents is present in the A and/or B components, or alternatively added at the time the foam is prepared. These foams can be rigid, flexible, or semi-rigid foams, and can have a closed cell structure, an open cell structure or a mixture of open and closed cells. These foams are used in a variety of well known applications, including but not limited to thermal insulation, cushioning, flotation, packaging, adhesives, void filling, crafts and decorative, and shock absorption.

The following non-limiting examples serve to illustrate the invention.

EXAMPLE 1 (COMPARATIVE EXAMPLE)

A polyol (B Component) formulation was made up of 100 parts by weight of a polyol blend, 1.5 parts by weight Niax L6900 silicone surfactant, 1.5 parts by weight water, 1.2 parts by weight pentamethyldiethylenetriamine (sold as Polycat 5 by Air Products and Chemicals) catalyst, and 8 parts by weight trans-1,3,3,3-tetrafluoropropene blowing agent. The total B component composition, when freshly prepared and combined with 120.0 parts by weight of Lupranate M20S polymeric isocyanate yielded a good quality foam with a fine and regular cell structure. Foam reactivity was typical for a pour in place foam. The total B-side composition (112.2 parts) was then aged at 130° F. for 62 hours, and then combined with 120.0 parts of M20S polymeric isocyanate to make a foam. The foam was very poor in appearance with significant cell collapse. Significant yellowing of the polyol premix was noted during aging.

EXAMPLE 2 (COMPARATIVE EXAMPLE)

A polyol (B Component) formulation was made up of 100 parts by weight of a polyol blend, 1.5 parts by weight Niax L6900 silicone surfactant, 1.5 parts by weight water, 1.2 parts by weight pentamethyldiethylenetriamine (sold as Polycat 5 by Air Products and Chemicals) catalyst and 8 parts by weight blowing agent trans-1-chloro-3,3,3-trifluoropropene. The total B component composition, when freshly prepared and combined with 120.0 parts by weight of Lupranate M20S polymeric isocyanate yielded a good quality foam with a fine and regular cell structure. Foam reactivity was typical for a pour in place foam. The total B-side composition (112.2 parts) was then aged at 130° F. for 168 hours, and then combined with 120.0 parts of M20S polymeric isocyanate to make a foam. The foam was very poor in appearance with significant cell collapse. Significant yellowing of the polyol premix was noted during aging.

EXAMPLE 3 (FOAM TEST)

A polyol (B Component) formulation was made up of 100 parts by weight of a polyol blend, 1.5 parts by weight Niax L6900 silicone surfactant, 1.5 parts by weight water, 2.0 parts by weight N,N-dicyclohexylmethylamine (sold as Polycat 12 by Air Products and Chemicals) catalyst (a different amine was used such that both this foam and the comparative example had the same initial reactivity), 1.75 parts by weight a bismuth based catalyst (sold as Dabco MB-20 by Air Products and Chemicals) and 8 parts by weight trans-1,3,3,3-tetrafluoropropene blowing agent. The total B component composition, when freshly prepared and combined with 120.0 parts by weight of Lupranate M20S polymeric isocyanate yielded a good quality foam with a fine and regular cell structure. Foam reactivity was typical for a pour in place foam. The total B-side composition (114.75 parts) was then aged at 130° F. for 336 hours, and then combined with 120.0 parts of M20S polymeric isocyanate to make a foam. The foam was excellent in appearance with no evidence of cell collapse. There was no yellowing of the polyol premix noted during aging.

EXAMPLE 4 (FOAM TEST)

A polyol (B Component) formulation was made up of 100 parts by weight of a polyol blend, 1.5 parts by weight Niax L6900 silicone surfactant, 0.5 parts by weight water, 2.0 parts by weight N,N-dicyclohexylmethylamine (sold as Polycat 12 by Air Products and Chemicals) catalyst (a different amine was used such that both this foam and the comparative example had the same initial reactivity), 1.75 parts by weight of zinc 2-ethylhexanoate (sold as 30-3038 by Strem Chemicals) and 8 parts by weight trans-1-chloro-3,3,3-trifluoropropene blowing agent. The total B component composition, when freshly prepared and combined with 103.0 parts by weight of Lupranate M20S polymeric isocyanate yielded a good quality foam with a fine and regular cell structure. Foam reactivity was typical for a pour in place foam. The total B-side composition (113.75 parts) was then aged at 130° F. for 336 hours, and then combined with 103.0 parts of M20S polymeric isocyanate to make a foam. The foam was excellent in appearance with no evidence of cell collapse. There was no yellowing of the polyol premix noted during aging

EXAMPLE 5 (FOAM TEST)

A polyol (B Component) formulation was made up of 100 parts by weight of a polyol blend, 1.5 parts by weight Niax L6900 silicone surfactant, 1.0 parts by weight water, 2.0 parts by weight N,N-dicyclohexylmethylamine (sold as Polycat 12 by Air Products and Chemicals) catalyst (a different amine was used such that both this foam and the comparative example had the same initial reactivity), 1.75 parts by weight a Potassium based catalyst (sold as Dabco K15 by Air Products and Chemicals) and 8 parts by weight trans-1-chloro-3,3,3-trifluoropropene blowing agent. The total B component composition, when freshly prepared and combined with 112.0 parts by weight of Lupranate M20S polymeric isocyanate yielded a good quality foam with a fine and regular cell structure. Foam reactivity was typical for a pour in place foam. The total B-side composition (114.75 parts) was then aged at 130° F. for 504 hours, and then combined with 112.0 parts of M20S polymeric isocyanate to make a foam. The foam was good in appearance with only slight evidence of cell collapse. There was very slight yellowing of the polyol premix noted during aging.

What is claimed is:

1. A stored foamable pre-mix composition having storage stability comprising:
    a. from about 1 wt. % to about 30 wt. % of blowing agent, said blowing agent comprising from about 5 wt. % to about 90 wt % of trans-1,3,3,3-tetrafluoropropene and/or trans-1-chloro-3,3,3-trifluoropropene,
    b. one or more polyols,
    c. one or more polymeric silicone surfactants, and
    d. a non-amine catalyst comprising an organometallic compound wherein the organometallic compound independently comprises a carboxylate salt of a metal selected from the group consisting of bismuth, zinc, tin and combinations thereof, wherein said stored foamable pre-mix composition has been stored for a period of at least several weeks and is sufficiently stable to form foams with no substantial collapse after said period of storage.

2. The stored foamable pre-mix composition of claim 1 wherein said non-amine catalyst comprises zinc 2-ethylhexanoate.

3. The stored foamable pre-mix composition of claim 2 wherein said non-amine catalyst is present in an amount of about 0.25 wt. % to about 3.0 wt. %, by weight of the composition.

4. The stored foamable pre-mix composition of claim 1 wherein said blowing agent further comprises a co-blowing agent selected from the group consisting of water, hydrocarbon, fluorocarbon, chlorocarbon, hydrochlorofluorocarbon, hydrofluorocarbon, halogenated hydrocarbon, ether, ester, alcohol, aldehyde, ketone, organic acid, gas generating material, and combinations thereof.

5. The stored foamable pre-mix composition of claim 1 further comprising an amine catalyst, provided said amine catalyst is present in an amount that does not negate the foam forming ability of said foamable composition after said storage period.

6. The stored foamable pre-mix composition of claim 5 wherein the amine catalyst is selected from the group consisting of N,N,N',N'',N''-pentamethyldiethyltriamine, N,N-dicyclohexylmethylamine; N,N-ethyldiisopropylamine; N, N-dimethylcyclohexylamine; N,N-dimethylisopropylamine; N-methyl-N-isopropylbenzylamine; N-methyl-N-cyclopentylbenzylamine; N-isopropyl-N-sec-butyl-trifluoroethylamine; N,N-diethyl -(α-phenylethyl)amine, N,N,N-tri-n-propylamine, dicyclohexylamine; t-butylisopropylamine ; di-t-butylamine; cyclohexyl-t-butylamine; di-sec-butylamine, dicyclopentylamine; di-(α-trifluoromethylethyl)amine; di-(α-phenylethyl)amine; triphenylmethylamine; 1,1-diethyl-n -propylamine; dimorpholinodiethylether; N-ethylmorpholine; N-methylmorpholine;
    bis(dimethylaminoethyl) ether; imidizole; n-methylimidazole; 1,2-dimethylimidazole;
    dimorpholinodimethylether; N,N,N',N',N'',N''-pentamethyldiethylenetriamine; N,N,N',N',N'',N''-pentaethyldiethylenetriamine; N,N,N',N',N'',N''-pentamethyldipropylenetriamine;
    bis(diethylaminoethyl) ether; bis(dimethylaminopropyl) ether; and combinations thereof.

7. A stored polyol premix composition having storage stability comprising:
    a. from about 1 wt. % to about 30 wt. % of blowing agent, said blowing agent comprising from about 5 wt. % to about 90 wt % of trans-1,3,3,3-tetrafluoropropene and/or trans-1-chloro -3,3,3-trifluoropropene,
    b. one or more polyols selected from the group consisting of polyester polyol, polyether polyol and mixtures of these,
    c. one or more polymeric silicone surfactants, and
    d. a non-amine catalyst comprising an organometallic compound wherein the organometallic compound comprises a carboxylate salt of a metal selected from the group consisting of bismuth, zinc, tin, and combinations thereof, wherein, said polyol premix composition has been stored for a period of at least several weeks and is sufficiently stable to form foams with no substantial collapse after said period of storage.

8. The polyol premix composition of claim 7 wherein said non-amine catalyst comprises zinc 2-ethylhexanoate.

9. The polyol premix composition of claim 8 wherein said non-amine catalyst is present in an amount of about 0.25 wt. % to about 3.0 wt. %, by weight of the composition.

10. The polyol premix of claim 7 further comprising an amine catalyst, provided said amine catalyst is present in an amount that does not negate the foam forming ability of said polyol premix composition after said storage period.

11. The stored foamable premix of claim 1 wherein said blowing agent comprises from about 5 wt. % to about 90 wt % of trans-1-chloro-3,3,3-trifluoropropene.

12. The polyol premix of claim 7 wherein said blowing agent comprises from about 5 wt. % to about 90 wt % of trans-1-chloro-3,3,3-trifluoropropene.

13. The stored foamable premix of claim 1 wherein said polyol comprises polyester polyol.

14. The stored foamable premix of claim 1 wherein said polyol comprises polyether polyol.

15. The stored foamable premix of claim 14 wherein said polyether polyol comprises Mannich polyol.

16. The stored foamable premix of claim 1 wherein said polyol comprises a polyester polyol and/or polyether polyol.

17. The stored foamable premix of claim 1 consists essentially of a mixture of polyester polyol and polyether polyol.

18. The polyol premix of claim 7 wherein said polyol comprises a mixture of polyether polyol and polyester polyol.

19. The polyol premix of claim 18 wherein said polyether polyol comprises Mannich polyol.

20. The polyol premix of claim 7 wherein said polyol comprises polyether polyol.

\* \* \* \* \*